UNITED STATES PATENT OFFICE.

CHAS. A. BROQUETTE, OF RUE NEUVE SAINT NICHOLAS, SAINT MARTIN, FRANCE.

IMPROVEMENT IN MATERIAL FOR TRANSFERRING COLORS IN CALICO-PRINTING.

Specification forming part of Letters Patent No. 8,035, dated April 15, 1851.

*To all whom it may concern:*

Be it known that I, CHARLES ALEXANDER BROQUETTE, of Rue Neuve Saint Nicholas, Saint Martin, in the Republic of France, chemist, a citizen of the Republic of France, have invented or discovered Improvements in Printing and Dyeing Fibrous and other Materials; and I, the said CHARLES ALEXANDER BROQUETTE, do hereby declare that the nature of my said invention and the manner in which the same is to be performed are fully described and ascertained in and by the following statement thereof—that is to say:

The invention consists, first, in using azotized matter, slaked lime, and oil to compose a mastic fit for applying to such substances as aforesaid the colors which are incorporated in the said mastic, which mastic thus colored and being applied to the substances by the usual means in printing is there retained in a certain degree of insolubility, which it acquires by its desiccation and the action of the steaming and of the lime; second, in using also an azotized matter with oil to compose a preparation or mordant, which, being applied and retained in a certain degree of insolubility upon fibers, threads, and tissues of a vegetable nature of every description by means of an aluminic salt and of the steaming, will impart to the said substances the property of better uniting to or attracting the coloring-matter of archil, and in general other coloring-matters, either in printing or dyeing.

In order that my invention may be the more plainly understood and easily applied to practice, I shall now proceed to describe the means which I employ.

I prefer using azotized matters obtained from milk and the muscular fiber of animals. If the azotized matter is obtained from milk, the milk should be used only after having been well skimmed and become sour, either by the action of the air or by the addition of chemical agents adequate to produce fermentation. When the cheesy matter is formed it should be drained until it has obtained the consistency of a firm paste, after which the paste is divided by being passed through a sieve made of galvanized wire having about sixty-four holes per square inch. This preparation is then thrown into six times its weight of boiling water, which is kept boiling for twenty-five minutes. This interval being elapsed, the cheesy matter is thrown on a linen filter of a sufficiently close texture to retain the same. It is allowed to drain, and then it is washed in cold water until the water no longer reddens the reaction-paper. When the cheesy matter has been perfectly drained again it is passed through a sieve composed of galvanized wire having about one hundred and forty-four holes per square inch. It is then dried. In this state, if the azotized matter is not sufficiently pure to be used, it must be purified by being submitted to the following treatment: In ten pounds of pure water, to which are added two ounces of ammoniac, dissolve in a cold state one pound of cheesy precipitate. When the dissolution is complete, after twelve hours, or thereabout, precipitate the solution by means of an acid. I use preferably the acetic acid used in commerce, with four times its weight of water. The quantity of acid used must be such as will precipitate all the cheesy matter. The precipitate is gathered into a linen filter, and when it is drained it is washed in twenty times its weight of water. It is then drained anew and submitted three successive times to a similar process of washing, after which this preparation is drained again, and is then divided, as has been mentioned above, and dried in this state. This preparation constitutes the extract of caseine which I use.

If the azotized matter is obtained from the muscular fiber of animals, I take flesh and triturate it in cold water until all the matters soluble in water have disappeared, (gone off.) I then put the solid matter drained in four times its weight of hot water, to which water is added, when it is a few degrees under boiling-heat, a hot solution of caustic soda. The quantity of crystallized caustic soda to be used should be one-tenth of the dried animal matter to be dissolved, and this soda is itself dissolved in ten times its weight of water. The animal matter to be dissolved must be perfectly divided in order that the solution may be effected quickly and equally, and to this end stir quickly while the solution of caustic alkali is being poured in. The solution of the animal matter being effected, it is passed through such a linen filter as will retain all the undissolved matters. It is mixed with an equal quantity of its weight of cold water, and it is precipitated by means of acetic acid mixed in four times its weight of water in such a quantity that all the azotized matter be precipitated. The precipitate is first drained, as has been said above in reference to the extract of caseine, then worked four times in the same way and dried, after having been expressed and divided through a sieve having about one hundred and forty-four holes to the square inch. This azotized matter thus prepared constitutes the extract of fibrine such as I use it.

When I use the azotized matters to prepare a mastic with which I wish to incorporate colors I use in preference the extract of fibrine. To this end I powder with care one pound of extract of fibrine, which I then mix with one-seventh of its weight of hydrate of lime, (slaked lime passed through a fine sieve.) I then mix the whole in seven pounds of water, to which I previously add two ounces of a solution of liquid ammonia, or half an ounce of caustic potash crystallized. This dissolution, the density of which is varied by increasing or decreasing the quantity of water, is effected in six, twelve, or twenty-four hours, according to the divided state of the extract of fibrine. It is then passed, and a liquid is obtained to which colors are incorporated, and preferably such as are not attacked by alkalies.

The manner of incorporating the colors to the mastic has nothing peculiar. If, for instance, an ultramarine-blue color is to be prepared, you mix with care one pound of that blue with four pounds of the extract of fibrine solution, and this color having been passed is ready for use. In order to make an archil-violet color, mix with care one pound of precipitate or extract of archil of a strength proportioned to obtain a medium shade with four pounds of extract of fibrine solution; add then eight ounces of the oxide of magnesium prepared with a little water, as will be stated hereinafter, and this color being passed is ready for use.

In all colors prepared with the mastic from three to five per cent. of dyers' olive-oil may be added, (such olive-oil as dyers use;) but this addition is indispensable for archil color, and must be fifteen per cent. to the weight of the extract of fibrine solution used. It must be observed that when it is intended to add oil to the colors the extract of fibrine solution must be modified as follows: The extract of fibrine is dissolved in the quantity of water already stated without adding then any hydrate of lime, but by using twice as much as the stated proportion of caustic soda or of liquid ammoniac. The oil is then added, and it is when the oil is well mixed with the solution that hydrate of lime (to be previously diluted in a sufficient quantity of water to form a paste) is added in the proportion of ten per cent. of the extract of fibrine used. When the colors (or pigment) so prepared have been applied to the substances which are to be printed and are dried the said substances are steamed for about twenty-five minutes in the usual manner.

When I use the azotized matter to prepare a mordant that will prepare the fibers, threads, and tissues, and other vegetable substances of every description, as also threads and tissues composed in part of animal substances and in part of vegetable substances, to be printed or dyed with archil color or other colors, I use the extract of caseine in preference. Dissolve one pound of extract of caseine in seven pounds of water, in which add previously two ounces of liquid ammonia. When the dissolution is operated (after twelve hours, or about) this solution is poured in three pounds of dyers' olive-oil and stirred until the mixture is complete. I next add three pounds of cold water, stirring still with care. The substances to be prepared are passed in this mordant or preparation and afterward expressed or drained, so that those substances may retain only their weight of the said mordant. These substances are then dried, and then exposed to steam during twenty-five minutes. After the steaming pass them in a cold solution of stannate of soda at 9°; and after this operation, without any previous washing or drying, the substances are passed in a cold solution compound of one pound alum to nine pounds water. After being passed in the alum bath the substances are washed during eight or ten minutes in running water. They are then drained in the drain or drainer. They are then passed in a solution of Senegal gum composed of one and a half pound gum to nine pounds water, in which are dissolved about six or seven ounces of nitrate of ammonia. After this operation the substances are dried in the air. As to the means to be used for giving this mordant to the various substances, they are the same as those commonly used in print-works. If skeins, they are drained (or expressed) in the usual manner, and if tissues they are expressed between two cylinders covered with cloth.

When I wish to prepare warps composed of vegetable substances and destined to receive a weft of an animal nature I use the following mordant by means of the machines commonly used in print-works for sizing the warps: I dissolve one pound of extract of caseine in seven pounds water containing two ounces of liquid ammonia. I add three pounds of dyers' olive-oil with the precautions already stated. When about to use this mordant I add to it two per cent. of the total weight of hydrate of lime (slaked lime.) When the mordant has been applied and dried the warps are steamed for twenty-five minutes. In all cases where the azotized mordant is used the tissue must have been previously perfectly bleached, and it is necessary to use soap. When the prepared threads or warps are to be used in forming tissues with a weft of wool or any other animal substance, those tissues must be bleached when woven, and it is necessary in that case not to use too strong soap or carbonate of soda in order to spare the mordant in the bleaching.

I think it necessary to observe that such solutions of extract of caseine as comprise hydrate of lime cannot be preserved long, and they cease to be fit for use when from their previous liquid state they become gelatinous.

For the mastic and also the azotized mordant I use hydrate of lime and alumina, in order to increase the insolubility of azotized matters; but I do not propose to confine myself to the use of those substances, nor to the method which I have specified, and, on the contrary, I do reserve to myself the use of alkaline earths and other earths and of their salts, as also the use of all the combinations which they form with other chemical agents, in order to use them in modifying and improving the above mastic and preparation; and notwithstanding that I give the preference to the azotized mordant which I have hereinbefore specified, and which is composed both of oil and extract of caseine, as I have ascertained that an azotized oily or fat vegetable or animal matter can to a certain extent impart to the aforesaid vegetable substances the property of uniting to or attracting the coloring-matter of archil and in general any other coloring-matters, and I claim its use, as hereinafter stated.

Fibers, threads, tissues, or other substances impregnated with mordant, as I have previously described, may be printed or dyed in the usual manner.

To prepare archil-violet color I put in an earthen vessel of suitable size one pound of oxide of magnesium and pour into it a sufficiency of water to form a somewhat firm paste, which should be kneaded during five or six minutes, after which water is added by degrees until six pounds have been used in all. Next add to this preparation one pound of precipitate or extract of archil of a strength proportioned to obtain a medium shade. When the mixture is effected add besides from eight ounces to one pound of bicarbonate of ammonia and three pounds gum, stir with care, and when the gum is dissolved pass the color as usual, and it is then fit for use. The addition of bicarbonate of ammonia is not indispensable; but it renders the color more intense and more bright. The steaming of substances printed with this color requires no other precaution than that of giving to the tissue previous to or during the steaming sufficient moisture to cause the color well to develop itself.

The use of oxide of magnesium has the effect of causing archil color to come out of the steam in a brightened state—that is to say, violet—and thereby is avoided the submitting afterward the substances so printed to an alkaline bath, which bath has the effect of impairing, weakening, and destroying in part red, green, or other colors that would accompany the archil color.

The substances prepared as aforesaid perfectly attracting archil color, this coloring-matter may be used to make chocolate colors by using the ordinary means.

Having thus described the nature of my invention and the manner in which the said invention must be used, I claim—

1. The use of extract of fibrine to form (with or without any other oily or fat matters, by the means which I have described or any other equivalent means) a mastic adequate to thickening and retaining on fibers, threads, tissues of every description and of every material or substance the archil color and such other colors as are incorporated with that mastic.

2. The above process of preparing and purifying the extract of caseine, in order, by the means which I have specified or any other equivalent means, to impart to fibers, threads, and tissues of vegetable nature of every description, by means of a preparation of mordant, the property of better uniting to or attracting the coloring-matter of archil, and in general other coloring-matters, either in printing or dyeing, whether this preparation or mordant be applied on the fibers or threads of vegetable nature previous to the weaving, or whether it be applied after the weaving on tissues of vegetable nature or on tissues composed partly of vegetable and partly of animal substances.

C. A. BROQUETTE.

Witnesses:
  WM. H. T. RITCHIE,
    *Of London,*
  JOSEPH MARQUETT,
    1 *Bishopsgate Churchyd., London.*